United States Patent
Kim et al.

(10) Patent No.: US 9,087,639 B2
(45) Date of Patent: Jul. 21, 2015

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon, Gyunggi-Do (KR)

(72) Inventors: Jong Han Kim, Gyunggi-Do (KR); Yoon Hee Lee, Gyunggi-Do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 237 days.

(21) Appl. No.: 13/722,524

(22) Filed: Dec. 20, 2012

(65) Prior Publication Data

US 2013/0286539 A1    Oct. 31, 2013

(30) Foreign Application Priority Data

Apr. 26, 2012  (KR) .................. 10-2012-0043978

(51) Int. Cl.
| | |
|---|---|
| H01G 4/005 | (2006.01) |
| H01G 4/30 | (2006.01) |
| H01G 4/01 | (2006.01) |
| H01G 13/00 | (2013.01) |
| H01G 4/012 | (2006.01) |
| H01G 4/12 | (2006.01) |

(52) U.S. Cl.
CPC ................. *H01G 4/01* (2013.01); *H01G 4/012* (2013.01); *H01G 4/30* (2013.01); *H01G 13/006* (2013.01); *H01G 4/1227* (2013.01)

(58) Field of Classification Search
USPC ................................ 361/303, 301.4
See application file for complete search history.

(56) References Cited

U.S. PATENT DOCUMENTS

| | | | |
|---|---|---|---|
| 2006/0198078 A1* | 9/2006 | Miyauchi et al. | 361/305 |
| 2012/0026642 A1* | 2/2012 | Kaneko et al. | 361/321.4 |
| 2012/0127626 A1* | 5/2012 | Chang et al. | 361/301.4 |

FOREIGN PATENT DOCUMENTS

JP    2004-311985 A    11/2004

* cited by examiner

*Primary Examiner* — Eric Thomas
(74) *Attorney, Agent, or Firm* — McDermott Will & Emery LLP

(57) ABSTRACT

There is provided a multilayer ceramic electronic component, including: a ceramic body; and internal electrodes formed inside the ceramic body and having a plurality of non-electrode regions, wherein, on a cross-section taken in length and thickness directions of the ceramic body, when a thickness of the internal electrode is denoted by Te, a continuity of the internal electrode is denoted by C, an area of the internal electrode is denoted by Ae, an area of the plurality of non-electrode regions is denoted by Ao, and a maximum diameter of the non-electrode region having the maximum diameter among the plurality of non-electrode regions is denoted by Pmax, $0.1\ \mu m \leq Te \leq 0.5\ \mu m$, $1.1\% \leq Ao/Ae \leq 3.2\%$, $Pmax \leq 120$ nm, and $95\% \leq C \leq 99.5\%$ are satisfied.

11 Claims, 5 Drawing Sheets

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0043978 filed on Apr. 26, 2012, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a multilayer ceramic electronic component allowing for ease of implementation of designed capacitance therein and allowing insulation breakdown and cracks thereof to be prevented.

2. Description of the Related Art

As the trend for electronic products has been toward the miniaturization thereof and implementation of high functionality therein, electronic product components have also been required to be miniaturized and highly-functionalized. Due to this requirement for the implementation of miniaturization and high capacitance, attention has been drawn to multilayer ceramic electronic components, and thus, the demands for the multilayer ceramic electronic components are increasing.

In order to realize the implementation of miniaturization and high capacitance in multilayer ceramic capacitors, internal electrodes have also been required to be highly laminated and thinned.

Generally, the internal electrode may be knotted and thus broken during a sintering procedure thereof. Therefore, capacitance formed by the internal electrodes may be decreased and capacitance may be irregularly formed, resulting in a deterioration of product reliability. Hence, in order to realize high capacitance, continuity of internal electrodes needs to be secured.

However, as the multilayer ceramic capacitors have been increasingly miniaturized and highly laminated, the internal electrodes have correspondingly been thinned, and as the internal electrodes have been thinned, these internal electrodes may be easily broken during a sintering procedure, and thus, continuity of the internal electrode may be difficult to secure.

SUMMARY OF THE INVENTION

An aspect of the present invention provides a multilayer ceramic electronic component capable of realizing designed capacitance and preventing insulation breakdown and cracks by controlling the size and the regional distribution of common material powder trapped in an internal electrode to thereby realize a continuity of 95% or above in the internal electrode.

According to an aspect of the present invention, there is provided a multilayer ceramic electronic component, including: a ceramic body; and internal electrodes formed inside the ceramic body and having a plurality of non-electrode regions therein, wherein, on a cross-section taken in length and thickness directions of the ceramic body, when a thickness of the internal electrode is denoted by Te, a continuity of the internal electrode is denoted by C, an area of the internal electrode is denoted by Ae, an area of the plurality of non-electrode regions is denoted by Ao, and a maximum diameter of the non-electrode region having the maximum diameter among the plurality of non-electrode regions is denoted by Pmax, $0.1\ \mu m \leq Te \leq 0.5\ \mu m$, $1.1\% \leq Ao/Ae \leq 3.2\%$, $Pmax \leq 120$ nm, and $95\% \leq C \leq 99.5\%$ are satisfied.

The thickness (Te) of the internal electrode may be an average thickness of the internal electrode.

The non-electrode region may include a common ceramic material.

The common ceramic material may be the same as a material constituting the ceramic body.

The non-electrode region may further include a pore.

According to another aspect of the present invention, there is provided a multilayer ceramic electronic component, including: a ceramic body; and internal electrodes formed inside the ceramic body and having a plurality of non-electrode regions therein, the internal electrode having a thickness (Te) satisfying $0.1\ \mu m \leq Te \leq 0.5\ \mu m$, wherein, on a cross-section taken in length and thickness directions of the ceramic body, when a continuity of the internal electrode is denoted by C and a maximum diameter of the non-electrode region having the maximum diameter among the plurality of non-electrode regions is denoted by Pmax, $Pmax \leq 120$ nm and $95\% \leq C \leq 99.5$ are satisfied.

Here, when an area of the internal electrode is denoted by Ae and an area of the plurality of non-electrode regions is denoted by Ao, $1.1\% \leq Ao/Ae \leq 3.2\%$ may be satisfied.

The thickness (Te) of the internal electrode may be an average thickness of the internal electrode.

The non-electrode region may include a common ceramic material.

The common ceramic material may be the same as a material constituting the ceramic body.

The non-electrode region may further include a pore.

According to another aspect of the present invention, there is provided a method of manufacturing a multilayer ceramic electronic component, the method including: preparing a conductive paste including a conductive metal powder and common material powder, a ratio of average grain diameter of the common material powder to average grain diameter of the conductive metal powder being below 1:6; forming internal electrodes on ceramic green sheets, respectively, by using the conductive paste; laminating the ceramic green sheets on which the internal electrodes are respectively formed, to thereby form a laminate; and sintering the laminate having the laminated ceramic green sheets thereinto form a ceramic body, wherein the ceramic body includes internal electrodes having a plurality of non-electrode regions therein, and on a cross-section taken in length and thickness directions of the ceramic body, when a maximum diameter of the non-electrode region having the maximum diameter among the plurality of non-electrode regions is denoted by Pmax, $Pmax \leq 120$ nm is satisfied.

Here, a ratio of weight of the common material powder to weight of the conductive metal powder may be 5% or lower based on 100% of weight of the conductive metal powder.

The common material powder may include common ceramic material powder.

The common ceramic material powder may contain barium titanate or strontium titanate.

Here, on the cross-section taken in the length and thickness directions of the ceramic body, when a continuity of the internal electrode is denoted by C, $95\% \leq C \leq 99.5\%$ may be satisfied.

Here, when an area of the internal electrode is denoted by Ae and an area of the plurality of non-electrode regions is denoted by Ao, $1.1\% \leq Ao/Ae \leq 3.2\%$ may be satisfied.

The internal electrode may have a thickness (Te) satisfying $0.1\ \mu m \le Te \le 0.5\ \mu m$.

The thickness (Te) of the internal electrode may be an average thickness of the internal electrode.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE EMBODIMENTS

Figure 1:
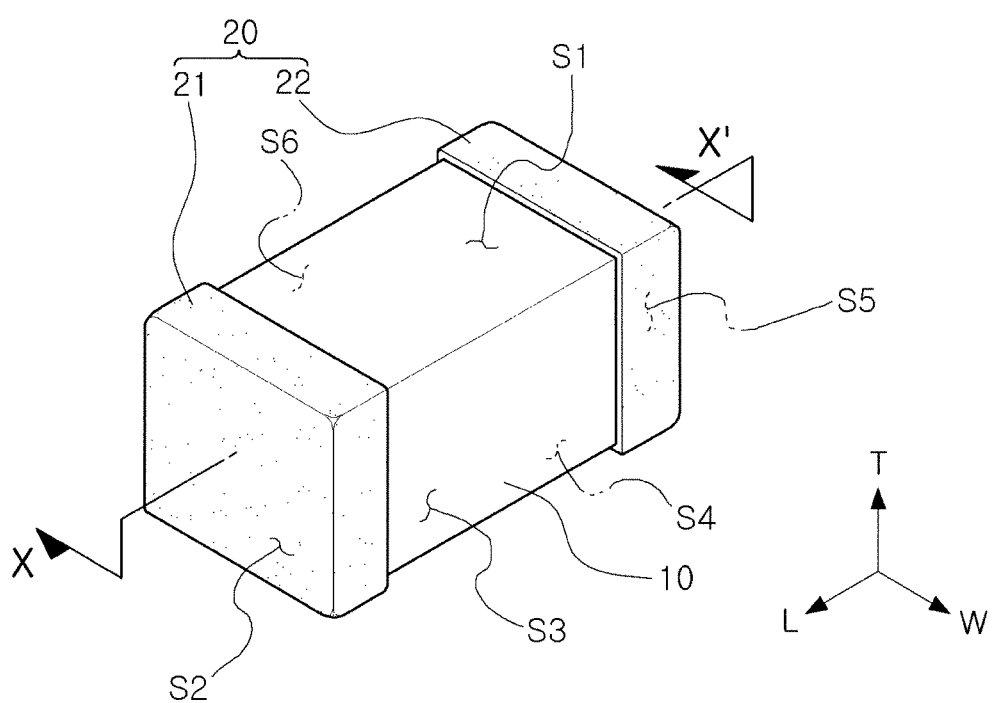
FIG. 1 is a perspective view of a multilayer ceramic electronic component according to an embodiment of the present invention.

Embodiments of the present invention will now be described in detail with reference to the accompanying drawings.

The invention may, however, be embodied in many different forms and should not be construed as being limited to the embodiments set forth herein.

The embodiments of the present invention are provided so that those skilled in the art may more easily understand the present invention.

The terminology used herein is for the purpose of describing particular embodiments only and is not intended to limit the inventive concept. As used herein, the singular forms "a" "an" and "the" are intended to include the plural forms as well, unless the context clearly indicates otherwise.

In addition, unless explicitly described otherwise, "comprising" any components will be understood to imply the inclusion of other components but not the exclusion of any other components.

In the drawings, the shapes and dimensions may be exaggerated for clarity, and the same reference numerals will be used throughout to designate the same or like components.

Figure 2:
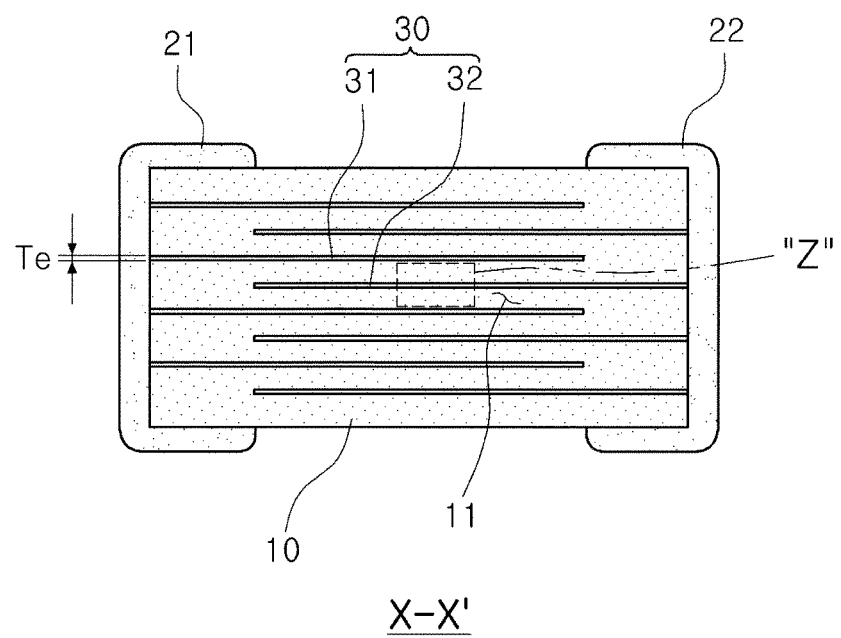
FIG. 2 is a cross-sectional view taken along line X-X' of FIG. 1.
Figure 3:
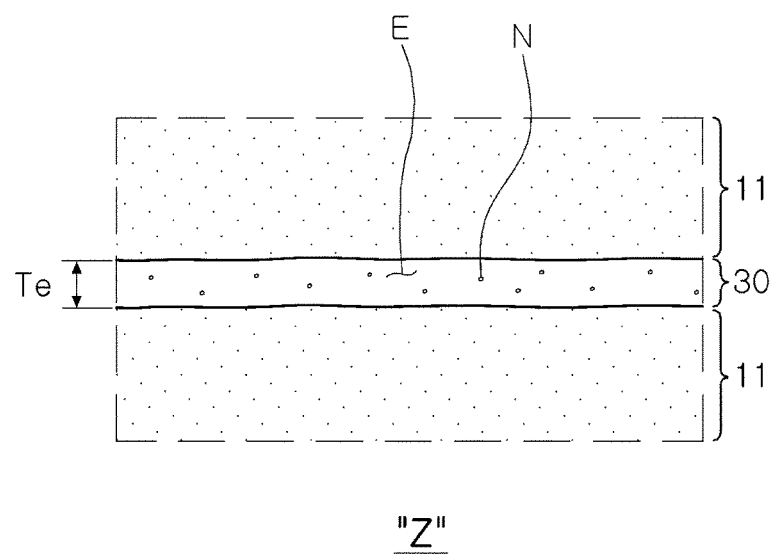
FIG. 3 is an enlarged view of part Z of FIG. 2.

FIG. 1 is a perspective view of a multilayer ceramic electronic component according to an embodiment of the present invention. FIG. 2 is a cross-sectional view taken along line X-X' of FIG. 1. FIG. 3 is an enlarged view of part Z of FIG. 2.

Referring to FIGS. 1 through 3, a multilayer ceramic electronic component according to an embodiment of the present invention may include a ceramic body 10, internal electrodes 30 laminated inside the ceramic body 10, and external electrodes 20 formed on external surfaces of the ceramic body 10.

The ceramic body 10 may have a rectangular parallelepiped shape. The terms "length direction", "width direction", and "thickness direction" used herein may be designated by the "L direction", "W direction", and "T direction" of FIG. 1, respectively. Here, the thickness direction refers to a direction in which the internal electrodes 30 are laminated. As for the ceramic body 10, the width may be equal to the thickness. The ceramic body 10 may have an upper surface S1, a lower surface S4, lateral surfaces S3 and S6, and end surfaces S2 and S5.

The ceramic body 10 may include a dielectric material having a relatively high dielectric constant, and specifically may include barium titanate or strontium titanate, but is not limited thereto. The dielectric material includes electric dipoles, and thus, may induce the accumulation of a relatively greater amount of charge.

The external electrodes 20 may be formed on the external surfaces of the ceramic body 10, and specifically, may be formed on the end surfaces S2 and S5 in the length direction ("L direction"). The external electrodes 20 may be extended to portions of the upper and lower surfaces S1 and S4 and the lateral surfaces S3 and S6 of the ceramic body 10. The external electrodes 20 may have first and second external electrodes 21 and 22, and electrical currents having opposite polarities are applied to the first and second external electrodes 21 and 22.

The external electrode 20 may include a conductive metal and glass. The conductive metal may include at least one selected from the group consisting of gold (Au), silver (Ag), palladium (Pd), copper (Cu), nickel (Ni), and alloys thereof.

The internal electrodes 30 may be laminated inside the ceramic body 10, and may have, without limitations thereon, a rectangular shape. The internal electrodes 30 may have first and second internal electrodes 31 and 32. The first and second internal electrodes 31 and 32 may be led out in directions opposite to each other and respectively connected to the first and second external electrodes 21 and 22, so that the first and second internal electrodes 31 and 32 may be charged with opposite polarities. Charges are accumulated in the first and second internal electrodes charged with opposite polarities, to thereby contribute to the formation of capacitance.

The internal electrode 30 may include at least one selected from the group consisting of gold (Au), silver (Ag), palladium (Pd), copper (Cu), nickel (Ni), and alloys thereof, but is not limited thereto. Any material that may impart relatively sufficient conductivity to the internal electrode 30 may be used without particular limitation.

In the present embodiment, the internal electrode 30 may have a plurality of non-electrode regions N therein.

On a cross-section taken in the length and thickness directions of the ceramic body 10 (L-T cross-section), a region trapped in the internal electrode 30 may be referred to as a non-electrode region N and a region except the non-electrode region N in the internal electrode 30 may be referred to as an electrode region E.

A conductive paste for internal electrodes may include conductive metal powder such as nickel or the like, a common material powder, and other sintering aids added thereto. The non-electrode region N may refer to a region in which the common material powder and the sintering aids are trapped inside the internal electrode.

The non-electrode region N may include materials such as ceramic powder, binder, solvent, and the like, except for the conductive metal powder used for the internal electrode, and, also, the non-electrode region N may be an empty space like a pore.

In the case in which the common material powder is surrounded by the conductive metal powder, specifically nickel powder grains, the common material powder may not escape out of the internal electrode, and thus, may be trapped in the internal electrode during the sintering procedure, and this may form the non-electrode region N.

The area of the non-electrode region N may be a criterion for the content of materials constituting the non-electrode region N. Specifically, the content of the common material added to the internal electrode 30 may be guessed.

The non-electrode region N may include common ceramic material powder added to the internal electrode 30. The common ceramic material powder may move from the internal electrode 30 to the ceramic body during the sintering procedure, and the common material powder may have the same kind as the ceramic powder for forming the dielectric layer, in order to prevent deterioration in characteristics of the dielectric layer. Examples of the common ceramic material powder may include, without limitation thereto, barium titanate powder.

Some of the common ceramic material powder may be expelled to a surface of the internal electrode 30 and sintered together with the ceramic powder for forming the dielectric layer, but some of the common ceramic material powder may not escape between the metal powder grains until the sintering is completed, and thus, may be trapped between grain boundaries. Therefore, the common ceramic material powder may form the non-electrode regions inside the internal electrode 30.

Sintering shrinkage of the internal electrode 30 may be suppressed by adding the common material powder to the paste for the internal electrode 30, and this may be explained as follows.

When the common material powder is added to the internal electrode 30, the sintering start temperature is increased to thereby suppress sintering shrinkage. The reason is that the common material powder is disposed between the conductive metal grains to prevent the conductive metal grains from being contacted with each other.

The sintering procedure may start from necking between the conductive metal grains. The necking is referred to as a phenomenon in which a contact portion between the conductive metal grains becomes relatively more widened. In the case in which the common material is positioned between the conductive metal grains, the contact between the conductive metal grains is restricted. Hence, occurrence of necking may be restricted, and by that, the sintering start temperature may be increased to suppress the sintering shrinkage.

In addition, the common material powder may fill an empty space that may not be filled with the conductive metal grains, and thus, the shrinkage degree at the time of sintering may be decreased.

In the present embodiment, the thickness (Te) of the internal electrode 30 may be 0.1 μm or greater but 0.5 μm or smaller. That is, the thickness (Te) of the internal electrode 30 may be 0.1 μm≤Te≤0.5 μm.

When Te≤0.1 μm, designed capacitance may not be realized. The reason is that, the internal electrode 30 is excessively thin, and thus, sintering shrinkage of the internal electrode 30 may not be suppressed and a continuity of 95% or above in the internal electrode 30 may not be realized even in spite of addition of the common material powder.

When Te>0.5 μm, the internal electrode 30 is relatively thick. Hence, a continuity of 95% or above in the internal electrode 30 may be realized without difficulty even in the case that sintering shrinkage of the internal electrode 30 occurs, and thus, the designed capacitance is not difficult to realize.

When 0.1 μm≤Te≤0.5 μm, it is likely to be difficult to realize a continuity of 95% or above in the internal electrode 30 and realize the designed capacitance. In the present embodiment, this defect may be solved by controlling other factors with respect to the non-electrode region N.

The thickness (Te) of the internal electrode 30 may be expressed by an average value. The thickness (Te) of the internal electrode 30 may be determined as an average value obtained by measuring the thicknesses of 10 regions that are equidistant, on an image of the internal electrode 30 extracted from the image obtained by scanning a cross-section taken in the length and thickness directions (L-T cross-section) of the ceramic body 10 using a scanning electron microscope, and then averaging the measured thicknesses.

The thickness of the internal electrode 30 may be calculated as the ratio of area of the internal electrode 30 to actual length of the internal electrode 30 (area of internal electrode/actual length of internal electrode).

Figure 4:
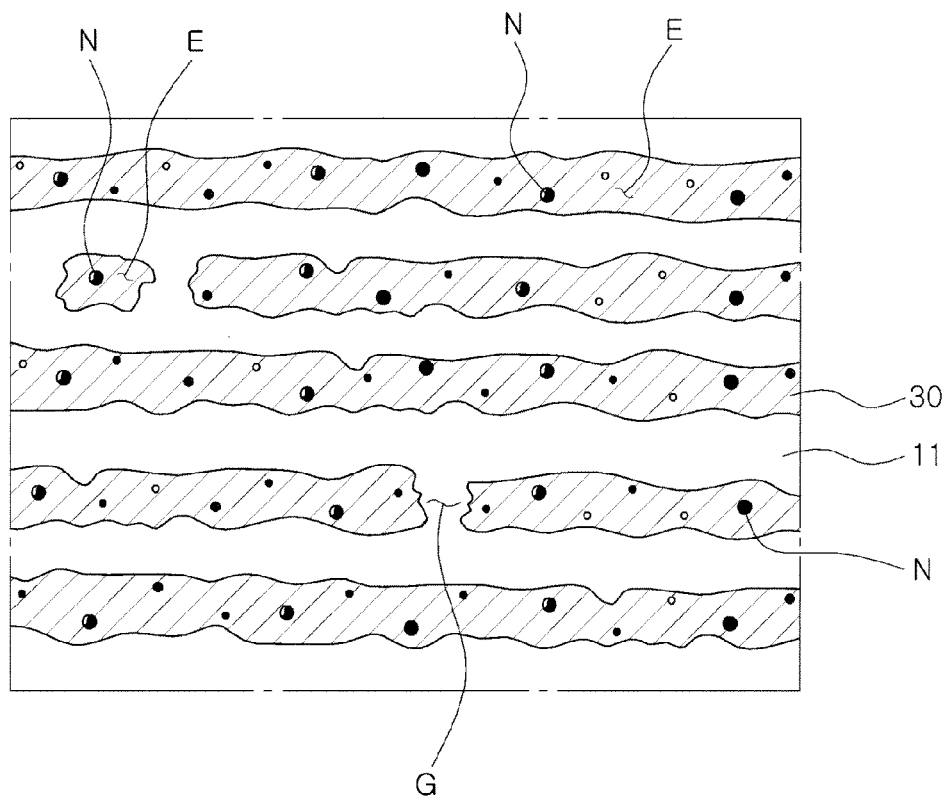
FIGS. 4 and 5 are diagrams for explaining continuity of the internal electrode.

Referring to FIG. 4, the area of the internal electrode 30 may refer to an area of the inclusion of the electrode region E and the non-electrode regions N, and the actual length of the internal electrode 30 may refer to a length of the internal electrode 30 excluding the gap formed in the internal electrode 30.

The area of the internal electrode 30, the area (Ae) of the electrode region E, the area (Ao) of the non-electrode regions N, and the actual length of the internal electrode 30 may be measured for one layer of internal electrode 30, and when multiplying these measurement values by the number of laminations, these values may be generalized throughout the entire multilayer ceramic capacitor.

In the present embodiment, the ratio of area (Ao) of the non-electrode regions N to area (Ae) of the electrode region E, Ao/Ae, may be 1.1%~3.2%. That is, the ratio may be 1.1%≤Ao/Ae≤3.2%.

When Ao/Ae<1.1%, a continuity of 95% or above in the internal electrode may be difficult to realize, and thus, designed capacitance may be difficult to realize.

Since the area (Ao) of non-electrode regions N accounts for a small percent of the internal electrode 30, sintering shrinkage effect is relatively small and continuity of the internal electrode 30 may be slightly improved. In the case in which continuity of the internal electrode 30 is small, the area of the internal electrode 30, which substantially contributes to capacitance formation, is reduced, and thus, designed capacitance is difficult to realize.

When Ao/Ae>3.2%, ceramic grains may abnormally grow, and thus, breakdown voltage (BDV) may be reduced.

The relatively large percent of the area (Ao) of the non-electrode regions N may indicate that the content of materials constituting the non-electrode regions N is relatively high, For example, in the case in which the same dielectric ceramic as the ceramic body is used as the common material, the common ceramic material powder added to the internal electrode 30 may escape from the internal electrode 30, and as a result, grains of the ceramic body may excessively grow and breakdown voltage may be reduced.

The measurement of the area (Ae) of the electrode region E and the area (Ao) of the non-electrode regions N will be described with reference to FIG. 4.

The area of the internal electrode 30 refers to a region in which the internal electrode 30 is continuously formed, but a disconnected portion of the internal electrode 30 is not included. The gap G formed in the internal electrode 30 may be excluded from the area of the internal electrode 30. The gap G refers to a pore penetrating the internal electrode 30, and may not include a pore formed on only a portion of the surface of the internal electrode 30 or inside the internal electrode 30.

From an optical image, the internal electrode 30 may be differentiated from the dielectric layer, and the non-electrode regions N and the electrode region E may be expressed by different degrees of lightness, which allows for differentiation therebetween.

The area of the internal electrode 30, the area (Ae) of the electrode region E, the area (Ao) of the non-electrode regions N, and the like may be measured by using, without being limited thereto, a computer program by SigmaScan Pro or the like.

The materials contained in a composition for the conductive paste may be trapped in the interfaces of metal grains constituting the internal electrode 30, that is, grain boundaries, during the firing procedure. In addition, the pores may be formed in the interfaces of metal grains during the firing procedure of the internal electrodes 30, and the pores may be formed inside the internal electrode 30 while they are trapped in the internal electrode 30.

When the common ceramic material powder is dispersed between the metal powders by controlling the grain diameter ratio thereof, sintering of the metal powder may be suppressed up to about 1000° C. or higher. The sintering of metal powder may be suppressed up to a predetermined temperature, and sintering of ceramic powder for forming the dielectric layer may start. When densification of the ceramic powder for forming the dielectric layer progresses, densification of the internal electrode 30 may also be initiated and sintering thereof may rapidly progress.

The common ceramic material powder may delay the sintering shrinkage start, and suppress sintering shrinkage of the metal powder. The common ceramic material powder having a controlled grain diameter ratio may prevent contact between the metal powder grains at the time of sintering shrinkage of the metal powder, and thus, suppress grain growth of the metal powder and prevent the internal electrode 30 from being knotted.

In the present embodiment, a maximum diameter Pmax of the non-electrode region N having a maximum diameter among the plurality of non-electrode regions N may be 120 nm or smaller. That is, Pmax≤120 nm may be satisfied.

The non-electrode region N may have irregular shapes such as a circular shape, an oval shape, a polygonal shape, or the like. Meanwhile, one non-electrode region N may have different diameters for respective portions thereof that are measured, and the maximum diameter of the non-electrode region N indicates a largest diameter among the measured diameters.

The fact that the maximum diameter of the non-electrode region N is relatively large may indicate that the non-electrode regions N are not uniformly distributed and agglomerate in a specific region.

This may show that the non-electrode regions N do not function to suppress sintering shrinkage of the internal electrode 30. The reason is that respective non-electrode regions N may effectively suppress sintering shrinkage of the internal electrode 30 when the non-electrode regions N are uniformly distributed in the internal electrode 30.

The non-electrode regions N may be uniformly distributed in the internal electrode 30, and the non-electrode regions N may be relatively small.

The fact that the non-electrode regions N are uniformly distributed in the internal electrode 30 may indicate that the non-electrode regions N effectively function to increase the shrinkage start temperature of the internal electrode 30.

When Pmax>120 nm, a continuity of 95% or above in the internal electrode may not be realized, and finally, designed capacitance may be difficult to realize.

The non-electrode regions N may be uniformly distributed in the internal electrode 30 while having relatively small sizes. This may be determined by the following factors.

A first factor is an amount of the common material added. The ratio of the area (Ao) of the non-electrode regions N to the area (Ae) of the electrode region E may be adjusted by controlling the amount of the common material added. When the content of the common material is relatively high, the area of the non-electrode regions N (Ao) may be increased, and when the content of common material is relatively small, the area of the non-electrode regions N (Ao) may be decreased.

A second factor is a maximum size of the grain diameter of the common material powder. As the grain diameter of the common material powder is reduced, the size of the non-electrode region N formed in the internal electrode may also be smaller.

A third factor is dispersibility of the common material powder in the paste. As the material constituting the non-electrode regions N, that is, the common ceramic material powder is relatively more uniformly dispersed in the paste for internal electrodes, the non-electrode regions N may also be uniformly distributed in the internal electrode 30. The dispersibility of common material powder in the paste may be improved by controlling additives such as a dispersant and the like and the time for milling during the procedure of preparing the conductive paste.

A fourth factor is the grain size of the common material powder. Specifically, this corresponds to the ratio of size of the common material powder grain to size of the conductive metal grain. The ratio of average grain diameter (D50) of the common material grains to average grain diameter (D50) of the conductive metal grain may be 1:6 or smaller. As such, the initial sintering shrinkage of the internal electrode 30 may be suppressed by using fine-grained common material.

A fifth factor is a temperature rise ratio at the time of sintering. When the temperature rise ratio at the time of sintering is relatively large, the time for which the common material powder is movable is relatively short during the sintering procedure, and thus, the common material powder is likely to remain in the site in which the common material is initially positioned as it is. Therefore, when the common material powder is in a well-dispersed state, the common material powder may be uniformly distributed in the internal electrode 30 even after sintering.

Whereas, when the temperature rise ratio at the time of sintering is relatively small, the time for which the common material powder is movable is sufficient, and thus, the common material powder may agglomerate, resulting in deterioration in dispersibility thereof.

In the present embodiment, continuity of the internal electrode 30 may be 95.0%~99.5%.

Figure 5:
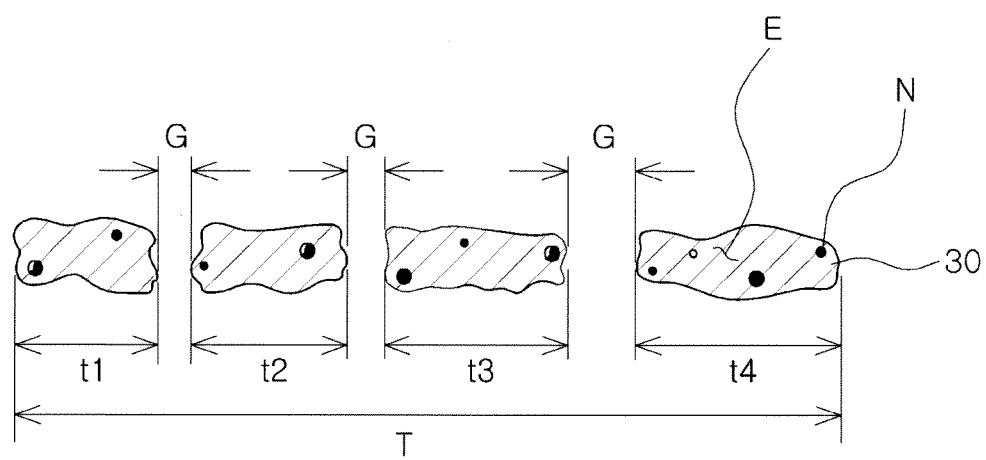

Referring to FIGS. 4 and 5, continuity of the internal electrode 30 may be defined as a ratio of a total length of the actually formed portions of the internal electrode 30 to ideal length of internal electrode 30 (total length of portions of actually formed internal electrode/ideal length of internal electrode).

The ideal length of internal electrode 30 and the total lengths of the actually formed portions of the internal electrode 30 may be measured by using an optical image obtained by scanning a cut cross-section of the multilayer ceramic capacitor, as described above.

More specifically, the ratio of a total length of portions of actually formed internal electrode to ideal length of internal electrode may be measured, on an image obtained by scanning a cross-section in the length direction, cut through a center in the width direction of the ceramic body.

In an embodiment of the present invention, the ideal length of internal electrode 30 may refer to the length including gaps G formed in the ideal area of one internal electrode, and the total length of the actually formed portions of the internal electrode 30 may refer to the length excluding the gaps G formed in the ideal area of one internal electrode 30. As described above, the gap G refers to a pore penetrating the internal electrode 30, and may not include a pore formed on only a portion of the surface of the internal electrode 30 or inside the internal electrode 30.

As shown in FIG. 5, the ideal length of internal electrode 30 and the actual length of the internal electrode 30 may be measured by selecting a portion of the optical image. More specifically, when the ideal length of the internal electrode 30 including pores formed in some regions of the internal electrode 30 is denoted by T, and the lengths of the actually formed portions of the internal electrode 30 are respectively denoted by t1, t2, t3, . . . , and tn, continuity of the internal electrode 30 may be expressed as (t1+t2+t3+·tn)/T. The actually formed portions of the internal electrode 30 are respectively expressed as t1, t2, t3, and t4 in FIG. 5, but the number of the actually formed portions of the internal electrode 30 is not particularly limited.

The total length of the actually formed portions of the internal electrode 30 may be measured by subtracting lengths of the gaps G from the entire length (T) of the internal electrode 30.

When C<95%, designed capacitance may be difficult to realize.

The fact that continuity of the internal electrode 30 is relatively large may indicate that the internal electrode 30 has few disconnection portions in the middle portion thereof, and thus, relatively large capacitance may be secured. On the contrary, the fact that continuity of the internal electrode 30 is relatively low is not favorable in forming capacitance since an effective surface for forming capacitance is decreased.

When C>99.5, stress reduction effect may be slight, and thus, cracks may occur.

The internal electrode 30 may be shrunken in the thickness direction during the sintering procedure, and as a result, a penetration hole may be formed in the thickness direction. The penetration hole formed in the internal electrode 30 may function to reduce stress in the ceramic body. In the case in which continuity of the internal electrode 30 is relatively excessively large, stress reduction effect due to the penetration hole is little, and thus, cracks may occur.

Another embodiment of the present invention may be directed to a method of manufacturing a multilayer ceramic electronic component, the method including: preparing a conductive paste including a conductive metal powder and common material powder, a ratio of average grain diameter of the common material powder to average grain diameter of the conductive metal powder being below 1:6; forming internal electrodes 30 on ceramic green sheets, respectively, by using the conductive paste; and laminating the ceramic green sheets having the internal electrodes 30 respectively formed thereon.

First, a conductive metal powder for imparting conductivity to external electrodes 20, a glass powder for achieving densification of the external electrodes 20, ethanol as organic solvent, polyvinylbutyral as binder, and the like are mixed, and then ball-milled, to thereby prepare a paste for the external electrodes 20.

A conductive paste composition for forming the internal electrodes 30 may further include a binder, a solvent, and other additives.

Examples of the binder may include, without limitation thereto, polyvinylbutyral, cellulose based resin, and the like. The polyvinylbutyral may enhance adhesive strength of the conductive paste and the ceramic green sheet.

The cellulose based resin has a chair structure, and elastic recovery thereof may be rapid at the time of transformation thereof. A flat print surface may be secured by including the cellulose based resin as above.

Examples of the solvent are not particularly limited, and butylcarbitol, kerosene, or a terpineol-based solvent may be employed. Specific examples of the terpineol based solvent may include, without limitation thereto, dihydro terpineol, dihydro terpinyl acetate, and the like.

Then, a conductive paste including a conductive metal powder and common material powder may be prepared. In the conductive paste, the ratio of average grain diameter of the common material powder to average grain diameter of the conductive metal powder is below 1:6.

When the ratio of grain diameter of the common material powder to grain diameter of the metal powder (common ceramic material powder/metal powder) is below 1:6, the common material powder may have difficulty in efficiently suppressing shrinkage of metal grains.

As the grain diameter of the common material powder is smaller than the grain diameter of the metal powder, common ceramic material powder may be distributed among metal powder.

The common material powder is distributed among the metal grains at the time of sintering, to thereby suppress grain growth of the metal grains. The common material smaller than pores formed at the time of sintering the metal grains has difficulty in restricting contact between the metal grains, and thus, may have difficulty in functioning to interrupt grain growth of the metal grains.

The grain diameters of the conductive metal powder and the common material powder may be measured as average grain diameters thereof. Specifically, an average grain diameter measurement method defined by the American Society for Testing and Materials (ASTM) may be performed.

Here, the grain diameter may refer to D50, and grains larger than or smaller than this may be present. Relatively small sized conductive metal grains may first be sintered in the initial stage of sintering, which may induce initial shrinkage. Fine-grained common material may be used in order to suppress initial shrinkage of the internal electrode 30.

It may be important to properly disperse the fine-grained common material when using the fine-grained common material. In a case in which the common material agglomerates, it may be meaningless to have used the fine-grained common material. The fine-grained common material may be well dispersed by using dispersant or the like or controlling dispersion conditions.

The dispersion degree of the common material powder may be estimated from the distribution of the common material in the internal electrode 30. Specifically, as the non-electrode regions N, that is, the common material grains are uniformly distributed while having relatively small sizes, they may be determined as being well dispersed. As more non-electrode regions N are relatively more uniformly distributed, the effect of suppressing sintering shrinkage of the internal electrode 30 may be higher, and this improves continuity of the internal electrode 30.

Then, the internal electrodes 30 may be formed on the ceramic green sheets by using the conductive paste.

The conductive paste may be printed on the ceramic green sheets by using a method such as screen printing or the like.

Then, the ceramic green sheets on which the internal electrodes 30 were formed may be laminated to thereby form a ceramic green laminate, which is then cut, to manufacture green chips. A sintered chip is manufactured by sintering the green chip, and external electrodes 20 are formed on external surfaces of the sintered chip, and thus, a multilayer ceramic electronic component may be completed.

In the case in which base metal is used for the internal electrode 30, the internal electrode 30 may be oxidized by a firing process conducted in the air. Hence, the firing process may be performed in the reducing atmosphere.

In addition, for easy mounting, a nickel plating layer and a tin plating layer may be formed on the external electrodes 20.

In the present embodiment, the ratio of weight of the common material to weight of the conductive metal may be 5% or lower based on 100% of weight of the conductive metal.

When the ratio of weight of the common material powder to weight of the conductive metal powder is 5% or lower, the ratio (Ao/Ae) of area (Ao) of the non-electrode regions N to area (Ae) of the electrode region E may be realized to have 1.1%~3.2%. The reason for this is that the percent for which the area of non-electrode regions N accounts may be adjusted by controlling the amount of common material added.

The conductive metal may include nickel.

The common material may include common ceramic material, and the common ceramic material may include barium titanate or strontium titanate.

The other descriptions of the conductive metal, the common material, and the like are the same as those shown in the above-described embodiment.

Hereinafter, the present invention will be described in detail, with reference to inventive examples and comparative examples.

A multilayer ceramic capacitor according to the inventive examples and comparative examples of the present invention was manufactured as follows.

Barium titanate powder, ethanol as organic solvent, and polyvinylbutyral as binder were mixed, and then ball milled, to thereby prepare a ceramic slurry, which was then used to produce ceramic green sheets.

A conductive paste for internal electrodes 30 containing nickel was printed on the ceramic green sheets, to thereby form internal electrodes 30 thereon, respectively. The resultant sheets were laminated to produce a green laminate, which was then subjected to isostatic pressing with a pressure of 1,000 kgf/cm$^2$ at 85° C.

The pressed green laminate was cut into green chips, which were then subjected to a debindering process in which they were maintained at 230° C. under an air atmosphere for 60 hours. The resultant green chip was sintered at 1000° C., to thereby manufacture a sintered chip. The sintering was performed under the reducing atmosphere to thereby prevent oxidation of the internal electrodes 30. The reducing atmosphere was set to $10^{-11}$~$10^{-10}$ atm, which was lower than the N/NiO equilibrium oxygen partial pressure.

A paste for external electrodes 20, containing copper powder and glass powder, was used to form external electrodes 20 on external surfaces of the sintered chip. A nickel plating layer and a tin plating layer were formed on the external electrodes 20 through electroplating.

A 0603 size multilayer ceramic capacitor was manufactured by the above method. The 0603 size may be 0. 6 μm±0.1 μm and 0.3 μm±0.1 μm in length and width, respectively. Characteristics of the multilayer ceramic capacitor were evaluated as follows.

The multilayer ceramic capacitor was determined as being good when capacitance thereof met 85% of the target value of designed capacitance or more, and as being defective when capacitance was 85% of the target value of designed capacitance or less.

Breakdown voltage (BDV) was evaluated by applying DC voltage at a rate of 1.0 V/sec. The multilayer ceramic capacitor was determined as being good when insulation breakdown did not occur and as being defective when insulation breakdown occurred, based on a breakdown voltage of 60V.

TABLE 1

|  | Te (μm) | Ao/Ae (%) | Pmax (nm) | Electrode Continuity (%) | Capacitance Characteristics | BDV | Cracks |
|---|---|---|---|---|---|---|---|
| Inventive Example 1 | 0.103 | 1.65 | 112 | 95.3 | Good | Good | Did Not Occur |
| Comparative Example 1 | 0.110 | 1.05 | 115 | 93.2 | Defective | Good | Did Not Occur |
| Inventive Example 2 | 0.112 | 3.12 | 106 | 96.2 | Good | Good | Did Not Occur |
| Comparative Example 2 | 0.112 | 3.45 | 105 | 95.7 | Good | Defective | Did Not Occur |
| Comparative Example 3 | 0.245 | 3.01 | 125 | 94.7 | Defective | Good | Did Not Occur |
| Inventive Example 3 | 0.255 | 2.75 | 107 | 95.8 | Good | Good | Did Not Occur |
| Inventive Example 4 | 0.256 | 1.13 | 113 | 95.1 | Good | Good | Did Not Occur |
| Inventive Example 5 | 0.272 | 2.97 | 99 | 97.2 | Good | Good | Did Not Occur |
| Comparative Example 4 | 0.286 | 0.98 | 89 | 93.4 | Defective | Good | Did Not Occur |
| Comparative Example 5 | 0.352 | 3.13 | 118 | 99.6 | Good | Good | Occurred |
| Inventive Example 6 | 0.367 | 2.45 | 115 | 96.1 | Good | Good | Did Not Occur |
| Inventive Example 7 | 0.398 | 2.86 | 116 | 96.3 | Good | Good | Did Not Occur |
| Inventive Example 8 | 0.432 | 3.09 | 115 | 99.0 | Good | Good | Did Not Occur |
| Comparative Example 6 | 0.444 | 3.18 | 117 | 99.6 | Good | Good | Occurred |
| Comparative Example 7 | 0.448 | 3.24 | 109 | 96.2 | Good | Defective | Did Not Occur |
| Comparative Example 8 | 0.475 | 2.99 | 131 | 94.3 | Defective | Good | Did Not Occur |

TABLE 1-continued

|  | Te (μm) | Ao/Ae (%) | Pmax (nm) | Electrode Continuity (%) | Capacitance Characteristics | BDV | Cracks |
|---|---|---|---|---|---|---|---|
| Inventive Example 9 | 0.491 | 2.78 | 114 | 98.3 | Good | Good | Did Not Occur |
| Comparative Example 9 | 0.506 | 1.07 | 102 | 94.3 | Good | Good | Did Not Occur |
| Comparative Example 10 | 0.512 | 3.22 | 114 | 96.7 | Good | Good | Did Not Occur |
| Comparative Example 11 | 0.520 | 2.66 | 122 | 93.3 | Good | Good | Did Not Occur |

In Table 1, Te refers to the thickness of the internal electrode 30; Ao/Ae refers to the ratio of area (Ao) of the non-electrode regions N to area (Ae) of the electrode region E in the internal electrode 30; and Pmax refers to a maximum diameter of the non-electrode region N having a maximum diameter among the plurality of non-electrode regions N.

Referring to Table 1, in Comparative Examples 1 and 4 in which values of Te are 0.103 μm and 0.286 μm, values of Ao/Ae are 1.05% and 0.98%, values of Pmax are 112 nm and 89 nm, and values of electrode continuity are 93.2% and 93.4%, respectively, BDV characteristics were good and cracks did not occur, but a designed capacitance was not realized. The reason is that the ratio of area of the non-electrode regions N to area of the electrode region E was relatively small, so that electrode continuity of 95% or higher was not realized.

In Comparative Examples 2 and 7 in which values of Te are 0.112 μm and 0.448 μm, values of Ao/Ae are 3.45% and 3.24%, values of Pmax are 105 nm and 109 nm, and values of electrode continuity are 95.7% and 96.2%, respectively, designed capacitance was realized and cracks did not occur, but BDV characteristics were defective. The reason for this is that, since the area of non-electrode regions N accounts for a relatively large percent of the internal electrode 30, the common ceramic material present in the internal electrode 30 escaped to the dielectric body, and as a result, dielectric grains grew between the internal electrodes 30 excessively.

In Comparative Example 3 in which the value of Te is 0.245 μm, the value of Ao/Ae is 3.01%, the value of Pmax is 125 nm, and the value of electrode continuity is 94.7%, designed capacitance was not realized. The reason is that the maximum diameter of the non-electrode region had a relatively large value, which indicated that the non-electrode regions N agglomerated instead of being uniformly distributed. Therefore, the non-electrode regions N could not effectively suppress shrinkage of the internal electrode 30, and thus, electrode continuity was deteriorated, and as a result, designed capacitance was not realized.

In Comparative Examples 5 and 6 in which values of Te are 0.352 μm and 0.444 μm, values of Ao/Ae are 3.13% and 3.18%, values of Pmax are 118 nm and 117 nm, and values of electrode continuity are 99.6% and 99.6%, respectively, designed capacitance was realized and BDV characteristics were good, but cracks occurred. The penetration holes of the internal electrode 30, which deteriorate continuity of the internal electrode 30, may reduce the stress in the ceramic body. However, when electrode continuity is excessively large, a stress reduction effect was barely present, resulting in occurrence of cracks.

In Comparative Example 8 in which the value of Te is 0.475 μm, the value of Ao/Ae is 2.99%, the value of Pmax is 131 nm, and the value of electrode continuity is 94.3%, designed capacitance was not realized. The reason is that the maximum diameter of the non-electrode region had a relatively large value, which may indicate that the non-electrode regions N agglomerated instead of being uniformly distributed. Therefore, the non-electrode regions N may not effectively suppress shrinkage of the internal electrode 30, and thus, electrode continuity may be deteriorated, and as a result, designed capacitance was not realized.

In Comparative Examples 9 to 11 in which values of Te are greater than 0.5 μm, designed capacitance was realized regardless of values of Ao/Ae, Pmax, and electrode continuity; BDV characteristic was good; and cracks did not occur. That is, the multilayer ceramic capacitor was not defective in the case in which the thickness of the internal electrode 30 was larger than 0.5 μm, but was defective in the case in which the thickness of the internal electrode 30 was 0.5 μm or smaller. The present invention has been made to remove defects that may be generated in the case in which the thickness of the internal electrode 30 was 0.5 μm or smaller.

Unlike the comparative examples shown as above, Inventive Examples 1 to 9 in which $0.1\ \mu m \leq Te \leq 0.5\ \mu m$, $1.1\% \leq Ao/Ae \leq 3.2\%$, $Pmax \leq 120$ nm, and $95\% \leq C \leq 99.5\%$ are satisfied, designed capacitance was realized; BDV characteristics were good; and cracks did not occur.

As set forth above, according to embodiments of the present invention, the distribution of regions of the barium titanate common material trapped in the internal electrode is adjusted by controlling the ratio of size of the barium titanate common material and size of the nickel powder used in the paste for internal electrodes, the adding amount thereof, and the temperature rise rate at the time of sintering, so that 95% or higher of electrode continuity may be secured, designed capacitance may be realized, and insulation breakdown and cracks may be prevented.

While the present invention has been shown and described in connection with the embodiments, it will be apparent to those skilled in the art that modifications and variations may be made without departing from the spirit and scope of the invention as defined by the appended claims.

What is claimed is:

1. A multilayer ceramic electronic component, comprising:
   a ceramic body; and
   internal electrodes formed inside the ceramic body and having a plurality of non-electrode regions,
   on a cross-section taken in length and thickness directions of the ceramic body, when a thickness of each of the internal electrodes is denoted by Te, a continuity of each of the internal electrodes is denoted by C, an area of each of the internal electrodes is denoted by Ae, an area of the plurality of non-electrode regions is denoted by Ao, and a maximum diameter of the non-electrode region having the maximum diameter among the plurality of non-electrode regions is denoted by Pmax, $0.1\ \mu m \leq Te \leq 0.5\ \mu m$, $1.1\% \leq Ao/Ae \leq 3.2\%$, $Pmax \leq 120$ nm, and $95\% \leq C \leq 99.5\%$ being satisfied.

2. The multilayer ceramic electronic component of claim 1, wherein the thickness (Te) of each of the internal electrodes is an average thickness of each of the internal electrodes.

3. The multilayer ceramic electronic component of claim 1, wherein the non-electrode region includes a common ceramic material.

4. The multilayer ceramic electronic component of claim 3, wherein the common ceramic material is the same as a material constituting the ceramic body.

5. The multilayer ceramic electronic component of claim 3, wherein the non-electrode region further includes a pore.

6. A multilayer ceramic electronic component, comprising:
a ceramic body; and
internal electrodes formed inside the ceramic body and having a plurality of non-electrode regions therein, each of the internal electrodes having a thickness (Te) satisfying $0.1\ \mu m \leq Te \leq 0.5\ \mu m$,
on a cross-section taken in length and thickness directions of the ceramic body, when a continuity of each of the internal electrodes is denoted by C and a maximum diameter of the non-electrode region having the maximum diameter among the plurality of non-electrode regions is denoted by Pmax, $Pmax \leq 120$ nm and $95\% \leq C \leq 99.5\%$ being satisfied.

7. The multilayer ceramic electronic component of claim 6, wherein, when an area of each of the internal electrodes is denoted by Ae and an area of the plurality of non-electrode regions is denoted by Ao, $1.1\% \leq Ao/Ae \leq 3.2\%$ is satisfied.

8. The multilayer ceramic electronic component of claim 6, wherein the thickness (Te) of each of the internal electrodes is an average thickness of each of the internal electrodes.

9. The multilayer ceramic electronic component of claim 6, wherein the non-electrode region includes a common ceramic material.

10. The multilayer ceramic electronic component of claim 9, wherein the common ceramic material is the same as a material constituting the ceramic body.

11. The multilayer ceramic electronic component of claim 9, wherein the non-electrode region further includes a pore.

* * * * *